United States Patent
Huang et al.

(10) Patent No.: US 10,324,800 B2
(45) Date of Patent: Jun. 18, 2019

(54) SYSTEM RECOVERY USING WOL

(71) Applicant: QUANTA COMPUTER INC., Taoyuan (TW)

(72) Inventors: Chih-Chia Huang, Taoyuan (TW); Chin-Lung Su, Taoyuan (TW); Tsai-I Yen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 129 days.

(21) Appl. No.: 15/410,177

(22) Filed: Jan. 19, 2017

(65) Prior Publication Data
US 2018/0203768 A1 Jul. 19, 2018

(51) Int. Cl.
| G06F 11/00 | (2006.01) |
| G06F 11/14 | (2006.01) |
| G06F 11/30 | (2006.01) |
| G06F 11/34 | (2006.01) |
| G06F 11/07 | (2006.01) |
| H04L 12/24 | (2006.01) |

(52) U.S. Cl.
CPC ........ *G06F 11/1441* (2013.01); *G06F 11/079* (2013.01); *G06F 11/0721* (2013.01); *G06F 11/0757* (2013.01); *G06F 11/3024* (2013.01); *G06F 11/3055* (2013.01); *G06F 11/3495* (2013.01); *H04L 41/0672* (2013.01); *H04L 41/24* (2013.01); *H04L 41/26* (2013.01); *G06F 2201/805* (2013.01); *G06F 2201/81* (2013.01); *G06F 2201/86* (2013.01)

(58) Field of Classification Search
CPC .................................................... G06F 11/1441
USPC ............................................................ 714/23
See application file for complete search history.

(56) References Cited

U.S. PATENT DOCUMENTS

| 6,795,450 | B1 | 9/2004 | Mills et al. |
| 2004/0141461 | A1 | 7/2004 | Zimmer et al. |
| 2008/0104424 | A1* | 5/2008 | Jennings ............... G06F 1/3209 713/300 |

(Continued)

FOREIGN PATENT DOCUMENTS

| JP | 2000276260 A | 10/2000 |
| JP | 2009253748 A | 10/2009 |

(Continued)

OTHER PUBLICATIONS

TW Office Action for Application No. 106113193, dated May 15, 2018, w/ First Office Action Summary.

(Continued)

*Primary Examiner* — Sarai E Butler
(74) *Attorney, Agent, or Firm* — Nixon Peabody LLP; Zhou Lu

(57) ABSTRACT

The present technology provides a system and method for smartly resetting a hang device of a server system based upon a Wake-on-Lan (WoL) message and status of the hang device. The system comprises a management device, a switch, a physical layer (PHY) coupled to a network, a network interface (NIC), a monitoring device and a delay circuit. The PHY is coupled to the network to receive network packets that includes a WoL message. The monitoring device is configured to receive status information from the management device and the WoL message, and reset the management device based upon received information.

20 Claims, 5 Drawing Sheets

(56) References Cited

U.S. PATENT DOCUMENTS

| | | | | |
|---|---|---|---|---|
| 2012/0305814 A1* | 12/2012 | Hou | ............... | H03K 17/223 250/552 |
| 2013/0336435 A1* | 12/2013 | Akkihal | ............... | H04J 3/0647 375/356 |
| 2015/0149815 A1* | 5/2015 | Maity | ............... | G06F 11/1435 714/5.11 |
| 2016/0234316 A1* | 8/2016 | Liao | ............... | H04L 67/142 |
| 2016/0266637 A1* | 9/2016 | Butcher | ............... | G06F 1/3209 |
| 2017/0150378 A1* | 5/2017 | Dumov | ............... | H04W 24/04 |

FOREIGN PATENT DOCUMENTS

| | | | |
|---|---|---|---|
| JP | 2011014075 | A | 1/2011 |
| JP | 2011109529 | A | 6/2011 |
| JP | 2014164507 | A | 9/2014 |
| JP | 2015517254 | A | 6/2015 |
| JP | 2016199050 | A | 12/2016 |
| TW | 201612748 | A | 4/2016 |
| WO | 2006047583 | A2 | 5/2006 |
| WO | 2013147900 | A1 | 10/2013 |
| WO | 2015105480 | A1 | 7/2015 |

OTHER PUBLICATIONS

TW Search Report for Application No. 106113193, (report conducted May 1, 2018) mailed with First Office Action dated May 15, 2018.

Extended European Search Report for application No. EP 17174500.3 dated Jul. 31, 2017.

JP Office Action for Application No. 2017-139545 dated Aug. 7, 2018, w/ First Office Action Summary.

* cited by examiner

SYSTEM RECOVERY USING WOL

TECHNICAL FIELD

The present technology relates generally to system recovery in a computing system.

BACKGROUND

Modern server farms or datacenters typically employ a large number of servers to handle processing and storage needs for a variety of application services. With the number of servers increase, processors or controllers on these servers have a high potential to get a hang.

However, when a controller of a server system is frozen, there are only a few options for an administrator of the server system to resume or reset the controller. The administrator has to wait out whether the controller can recover from the hang, or send a person to physically reset the controller or the server system. Thus, there is a need to provide a solution for smartly resetting a remote server system.

SUMMARY

Systems and methods in accordance with various examples of the present technology provide a solution to the above-mentioned problems by smartly resetting a hang device (e.g., a management device) of a server system based upon a Wake-on-Lan (WoL) message and status of the hang device. The system comprises a management device, a switch, a physical layer hardware (PHY) coupled to a network, a network interface (NIC), a monitoring device and a delay circuit. The PHY is coupled to the network and configured to receive network packets that include a WoL message. The monitoring device is configured to receive status information of the management device and the WoL message, and reset the management device based upon received information.

In some examples, the monitoring device has a first input pin to receive status information of the management device and a second input pin to receive a command message (e.g., the WoL message). The status information of the management device can be received directly from the management device or from a separate device connected to the management device.

The monitoring device can determine whether the management device is frozen based upon the status information of the management device. In an event that the management device is frozen and a WoL message is received, the monitoring device can send a reset signal to the management device. In an event that the management device is not frozen and a WoL message is received, the monitoring device can shield the management device from the WoL message and prevent the management device from being reset.

In some examples, the monitoring device is coupled to the management device via an output pin of the monitoring device and a power-on reset pin of the management device. The monitoring device can send a reset signal to reset the management device. In response to determining that the management device recovers after being reset, the switch can pass on network packets from the PHY directly to the management device.

In some examples, the NIC is coupled to the PHY via the switch of the system. In response to receiving the WoL message from the switch, the NIC can pass on the WoL message to a delay circuit and the monitoring device. The delay circuit can be a LC circuit, an RC circuit, and a suitable time delay circuit. The delay circuit is configured to withhold the WoL message for a threshold period of time and then pass on the WoL message back to the NIC to reset the NIC.

In some examples, the monitoring circuit is a single-stage watchdog circuit or a multistage watchdog circuit. In some examples, the switch can communicate with the PHY of the system via a first serial gigabit media independent interface (SGMII) and communicate with the NIC of the system via a second SGMII. In addition, the switch can communicate with the management device via a reduced gigabit media independent interface (RGMII).

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION

Various examples of the present technology provide systems and methods for resetting a hang device (e.g., a management device) of a server system based upon a WoL message and status of the hang device. The system comprises a management device, a switch, a PHY coupled to a network, a NIC, a monitoring device and a delay circuit. The PHY is coupled to the network and configured to receive network packets that include a WoL message. The monitoring device is configured to receive status information of the management device and the WoL message, and reset the management device based upon received information.

Figure 1A:
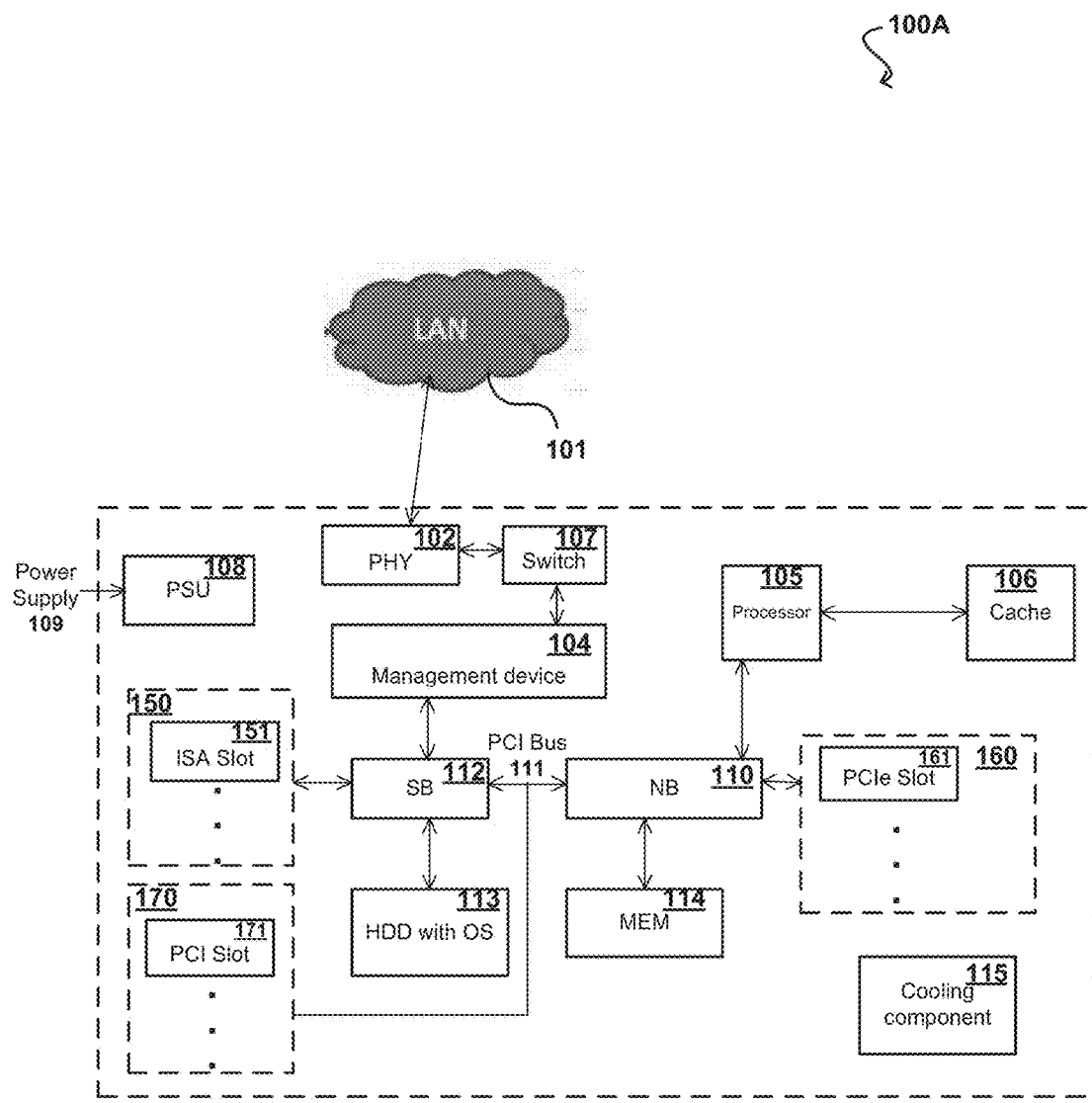
FIG. 1A illustrates a schematic block diagram of an exemplary server system in accordance with an implementation of the present technology.

FIG. 1A illustrates a schematic block diagram of an exemplary server system 100A in accordance with an implementation of the present technology. In this example, the server system 100A comprises at least one microprocessor or processor 105 connected to a cache 106, a physical layer hardware (PHY) that couples the system 100A to a network 101, one or more cooling components 115, a main memory (MEM) 114, at least one power supply unit (PSU) 108 that receives an AC power from a power supply 109 and supply power to various components of the server system 100A, such as the processor 105, cache 106, north bridge (NB)

logic 110, PCIe slots 160, Memory 114, south bridge (SB) logic 112, storage device 113, ISA slots 150, PCI slots 170, a management device 104 and a switch 107 that couples the PHY 102 to the management device 104. After being powered on, the server system 100A is configured to load software application from memory, computer storage device, or an external storage device to perform various operations. The storage device 113 is structured into logical blocks that are available to an operating system and applications of the server system 100A and configured to retain server data even when the server system 100A is powered off.

In some examples, the one or more cooling components 115 can be an air-cooled component, a liquid-cooled component, or a combination of air- and liquid-cooled components. In some examples, the one or more cooling components 115 comprise a plurality of fans located at the front side and/or backside of the server system 100A.

The main memory 114 can be coupled to the processor 105 via a NB logic 110. A memory control module (not shown) can be used to control operations of the memory 114 by asserting necessary control signals during memory operations. The main memory 114 may include, but is not limited to, dynamic random access memory (DRAM), double data rate DRAM (DDR DRAM), static RAM (SRAM), or other types of suitable memory.

In some implementations, the processor 105 can be multi-core processors, each of which is coupled together through a CPU bus connected to the NB logic 110. In some implementations, the NB logic 110 can be integrated into the processor 105. The NB logic 110 can also be connected to a plurality of peripheral component interconnect express (PCIe) slots 160 and a SB logic 112 (optional). The plurality of PCIe slots 160 can be used for connections and buses such as PCI Express x1, USB 2.0, SMBus, SIM card, future extension for another PCIe lane, 1.5 V and 3.3 V power, and wires to diagnostics LEDs on the server's chassis.

In this example, the NB logic 110 and the SB logic 112 are connected by a peripheral component interconnect (PCI) Bus 111. The PCI Bus 111 can support function on the CPU110 but in a standardized format that is independent of any of CPU's native buses. The PCI Bus 111 can be further connected to a plurality of PCI slots 160 (e.g., a PCI slot 161). Devices connect to the PCI Bus 111 may appear to a bus controller (not shown) to be connected directly to a CPU bus, assigned addresses in the processor 105's address space, and synchronized to a single bus clock. PCI cards can be used in the plurality of PCI slots 170 include, but are not limited to, network interface cards (NICs), sound cards, modems, TV tuner cards, disk controllers, video cards, small computer system interface (SCSI) adapters, and personal computer memory card international association (PCMCIA) cards.

The SB logic 112 can couple the PCI bus 111 to a plurality of expansion cards or slots 150 (e.g., an ISA slot 151) via an expansion bus. The expansion bus can be a bus used for communications between the SB logic 112 and peripheral devices, and may include, but is not limited to, an industry standard architecture (ISA) bus, PC/104 bus, low pin count bus, extended ISA (EISA) bus, universal serial bus (USB), integrated drive electronics (IDE) bus, or any other suitable bus that can be used for data communications for peripheral devices.

In the example, the SB logic 112 is further coupled to a management device 104 that is connected to the at least one PSU 108. In some implementations, the management device 104 can be a baseboard management controller (BMC), rack management controller (RMC), or any other suitable type of system controller. The management device 104 is configured to control operations of the at least one PSU 108 and/or other applicable operations. In some implementations, the management device 104 is configured to monitor processing demands, and components and/or connection status of the server system 100A.

Figure 1B:
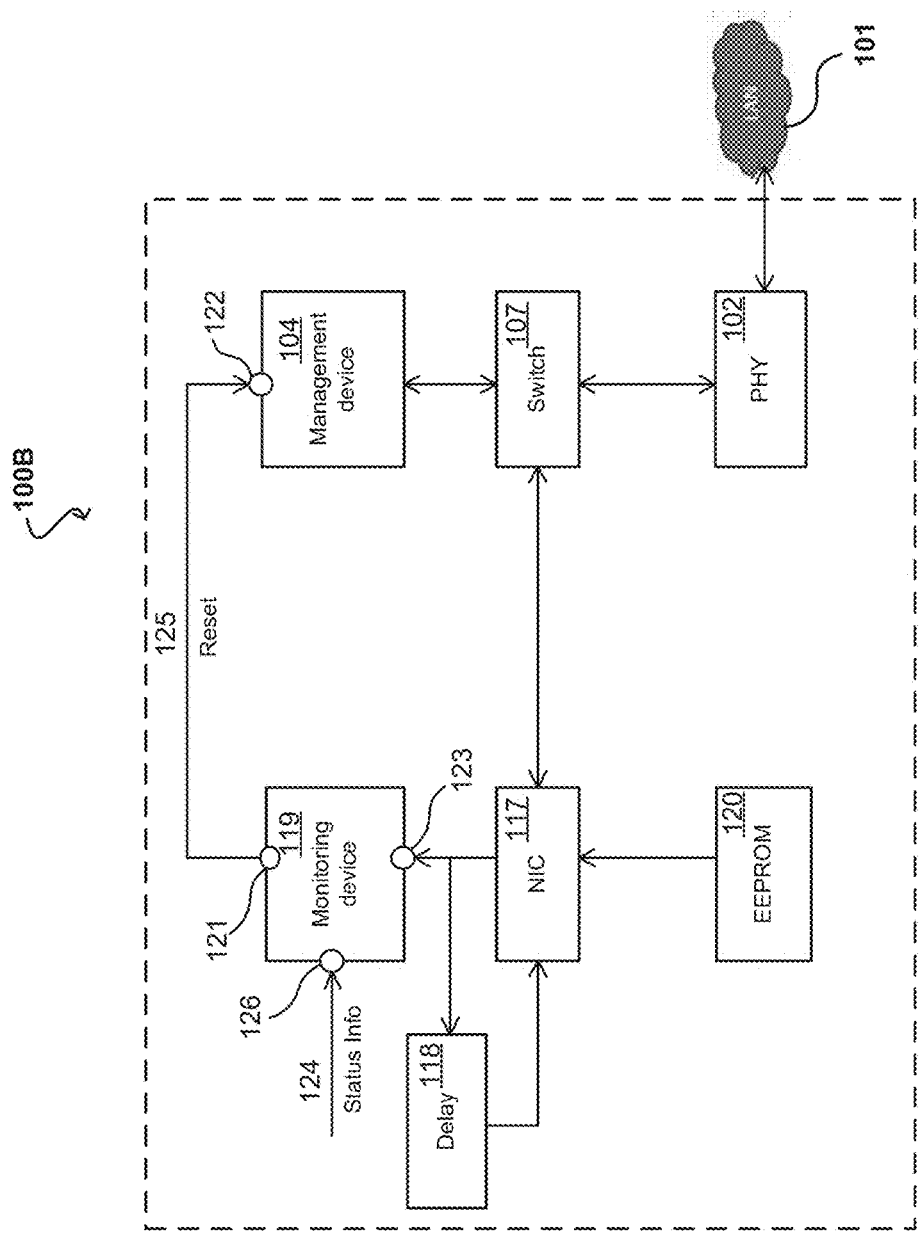
FIG. 1B illustrates schematic block diagrams of an exemplary system configured to smartly reset a hang device of the exemplary system in accordance with an implementation of the present technology.

FIG. 1B illustrates schematic block diagrams of an exemplary system 100B configured to smartly reset a hang device of the exemplary system in accordance with an implementation of the present technology. In this example, the system 100B comprises a PHY 102, a switch 107, a management device 104, a NIC 117, an EEPROM 120, a monitoring device 119, and a delay circuit 118. The PHY 102 is connected to the network 101 and configured to receive and send network packets to or from the network 101. Through the switch 107, the PHY 102 is coupled to the management device 104 and the NIC 117.

The NIC 117 can be configured to provide various interfaces for manageability traffic. For example, the NIC 117 can provide two different and mutually exclusive bus interfaces, e.g., system management bus (SMBus) and network controller-sideband interface (NC-SI). The EEPROM 120 can be configured to store management firmware of interface(s) of the NIC 117.

The monitoring device 119 is coupled to the management device 104 through an output pin 121 of the monitoring device 119 and an input pin 122 of the management device 104. The monitoring device 119 is configured to receive status information 124 of the management device 104 via a first input pin 126 and receive a command message (e.g., the WoL message) from the NIC 117 via a second input pin 123. In response to determining that the management device 104 is frozen and a WoL message is received, the monitoring device 119 can send a reset signal 125 to reset or resume the management device 104. Upon determining that the management device 104 recovers after being reset, the switch 107 can pass on network packets from the PHY 102 directly to the management device 104.

In response to determining that the management device 104 is not frozen and a WoL message is received, the monitoring device 119 can shield the management device 104 from the WoL message and prevent the management device 104 from being reset. In some examples, the monitoring device 119 can be a single-stage watchdog circuit or a multistage watchdog circuit.

In this example, the NIC 117 is connected to the delay circuit 118. The delay circuit 118 is configured to withhold a message (e.g., the WoL message) for a threshold period of time and then pass on the message back to the NIC 117. For example, if the message is the WoL message, the delay circuit 118 can pass on the WoL message back to the NIC 117 after the threshold period of time to reset the NIC 117.

Although only certain components are shown within the exemplary systems 100A-100B in FIGS. 1A-1B, respectively, various types of electronic or computing components that are capable of processing or storing data, receiving or transmitting signals, or providing fresh air to downstream components can also be included in the exemplary systems 100A-100B. Further, the electronic or computing components in the exemplary systems 100A-100B can be configured to execute various types of application and/or can use various types of operating systems. These operating systems can include, but are not limited to, Android, Berkeley Software Distribution (BSD), iPhone OS (iOS), Linux, OS X, Unix-like Real-time Operating System (e.g., QNX), Microsoft Windows, Window Phone, and IBM z/OS.

Depending on the desired implementation for the exemplary systems 100A-100B, a variety of networking and messaging protocols can be used, including but not limited to TCP/IP, open systems interconnection (OSI), file transfer protocol (FTP), universal plug and play (UpnP), network file system (NFS), common internet file system (CIFS), Apple-Talk etc. As would be appreciated by those skilled in the art, the exemplary systems 100A-100B illustrated in FIGS. 1A-1B are used for purposes of explanation. Therefore, a network system can be implemented with many variations, as appropriate, yet still provide a configuration of network platform in accordance with various examples of the present technology.

In exemplary configurations of FIGS. 1A-1B, the exemplary systems 100A-100B can also include one or more wireless components operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections, as known in the art. Various other elements and/or combinations are possible as well within the scope of various examples.

The above discussion is meant to be illustrative of the principles and various examples of the present technology. Numerous variations and modifications will become apparent once the above disclosure is fully appreciated.

Figure 2:
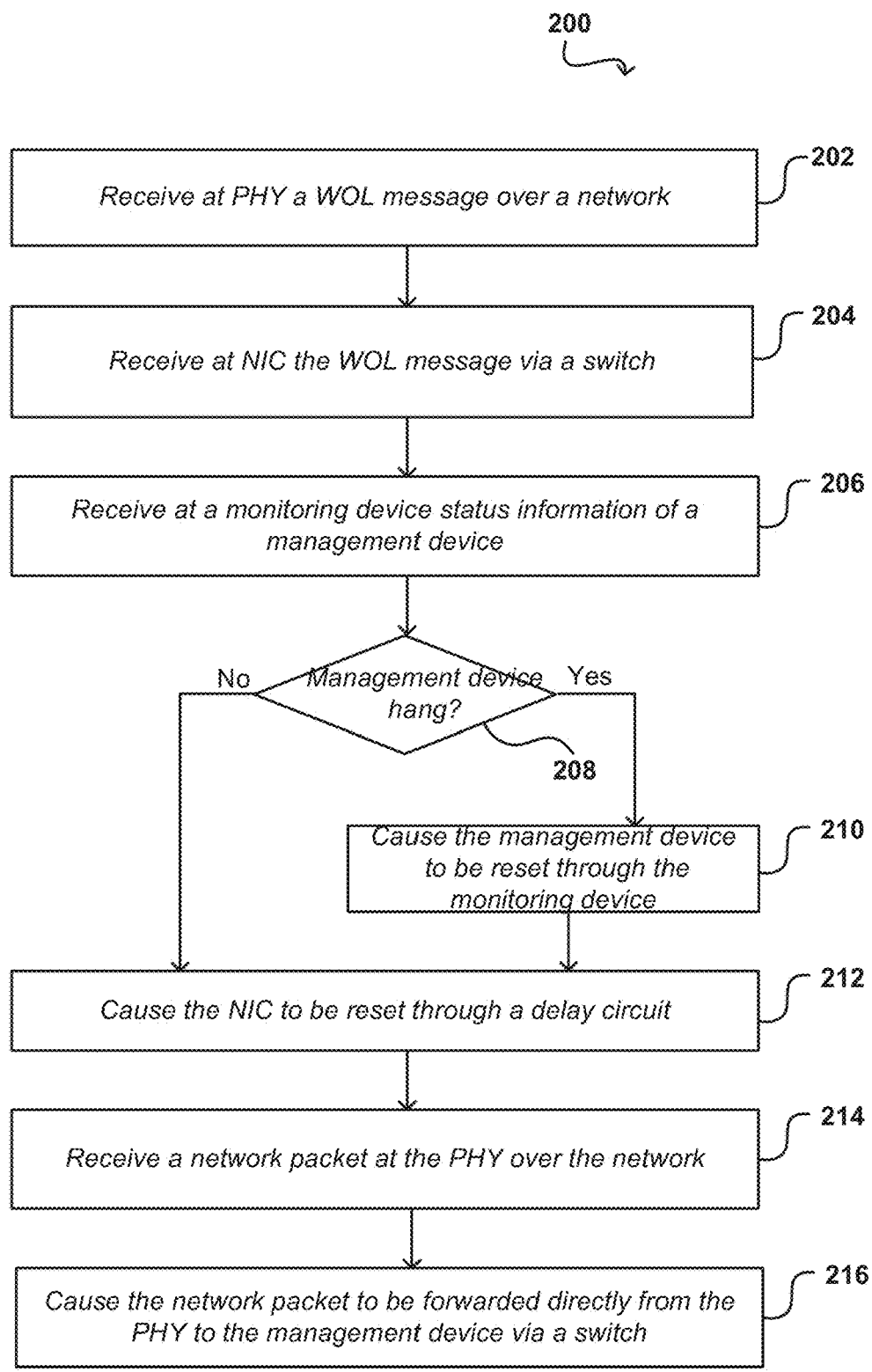
FIG. 2 illustrates an exemplary method for smartly resetting a management device of a system in accordance with an implementation of the present technology.

FIG. 2 illustrates an exemplary method 200 for smartly resetting a management device of a system in accordance with an implementation of the present technology. It should be understood that the exemplary method 200 is presented solely for illustrative purposes and that in other methods in accordance with the present technology can include additional, fewer, or alternative steps performed in similar or alternative orders, or in parallel. The exemplary method 200 starts with receiving a WoL message over a network, at step 202. The WoL message can be received at a PHY of the system, as illustrated FIGS. 1A-1B. The PHY can be configured to send out or receive network packets to or from the network. For example, the PHY can pass on network packets to the NIC and a management device via a switch of the system.

At step 204, the NIC receives the WoL message from the PHY via the switch, as illustrated FIG. 1B. The NIC can be configured to provide various interfaces for data traffic. In some examples, the NIC is connected to a monitoring device and a delay circuit.

At step 206, the monitoring device receives status information of the management device, as illustrated in FIG. 1B. The status information can be received directly from the management device or received from a separate device monitoring status of the management device. The monitoring device can determine whether the management device is frozen or not, at step 208.

At step 210, in response to determining that the management device is frozen, the monitoring device can cause the management device to be reset, as illustrated in FIG. 1B. For example, the monitoring device can send a reset signal to a power-on reset pin to the management device to reset the management device.

At step 212, a delay circuit can withhold the WoL message for a threshold period of time and then pass on the WoL message back to the NIC to reset the NIC, as illustrated in FIG. 1B.

At step 214, the PHY receives network packets over the network and passes on received network packets to the switch. At step 216, upon determining that the management device recovers after being reset, the switch can pass on the received network directly to the management device, as illustrated in FIG. 1B.

Terminologies

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks can be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments, networks, devices, ports, physical or logical links, and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources can include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources can be used to support virtual networks, virtual machines (VM), databases, applications (Apps), etc.

Cloud computing resources can include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

Figure 3:
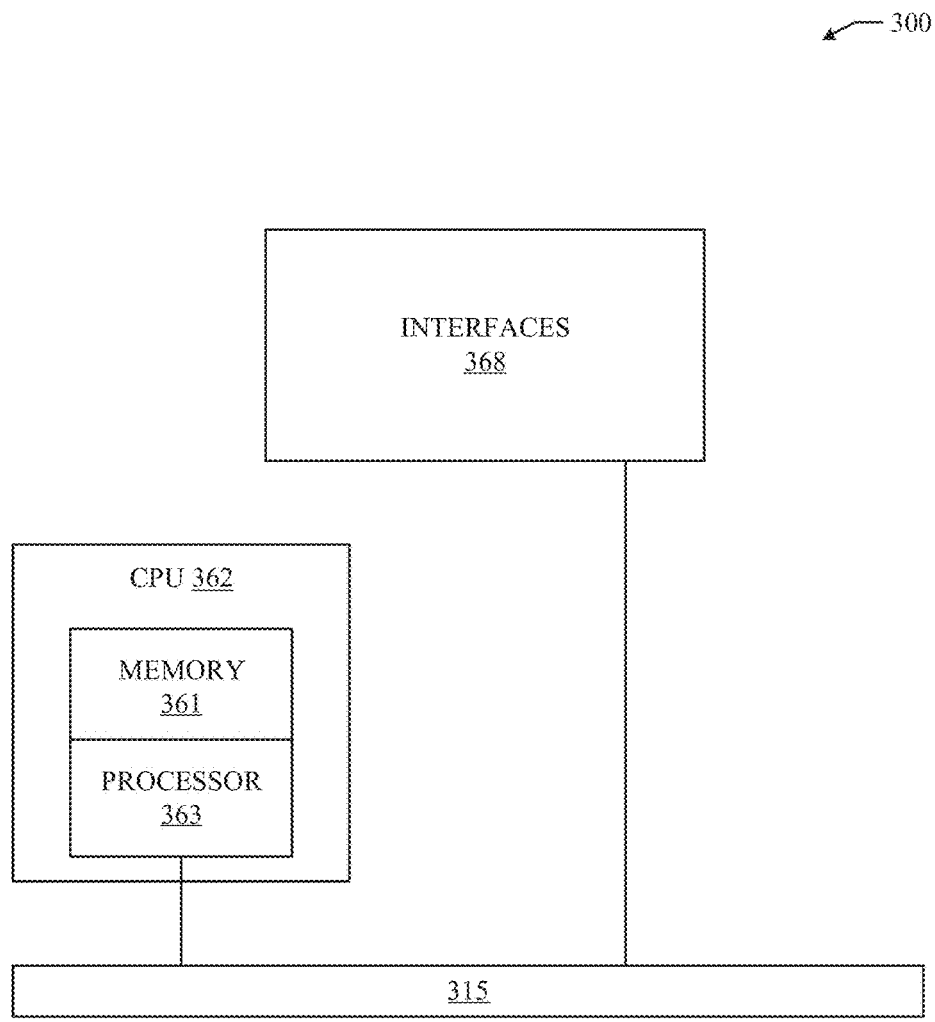
FIG. 3 illustrates an exemplary computing device in accordance with various implementations of the technology.
Figure 4:
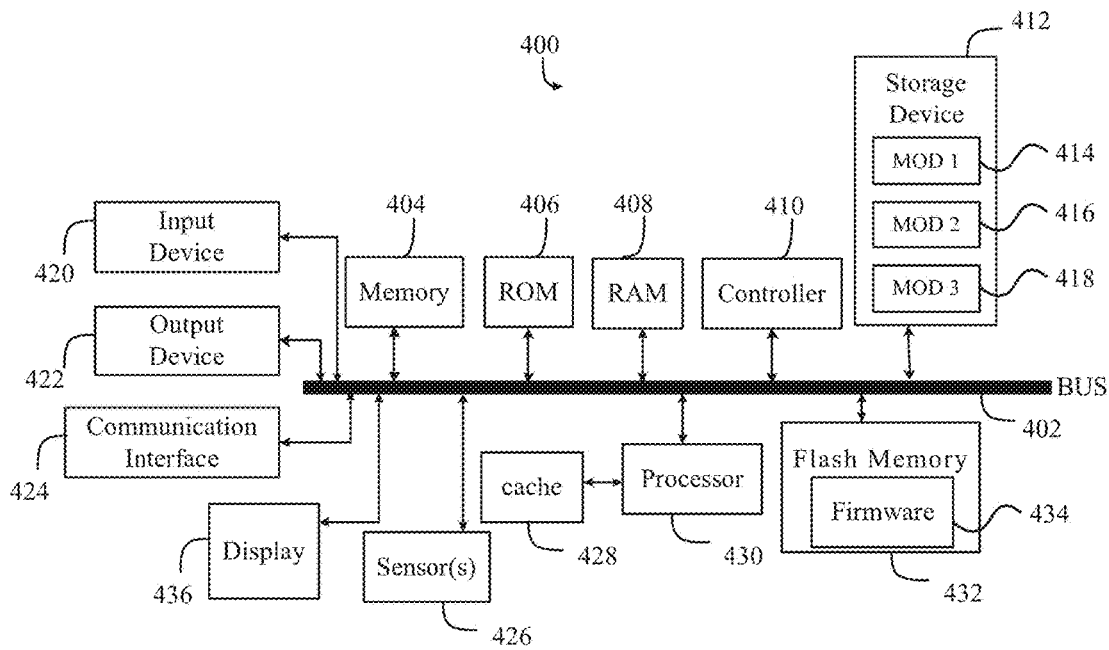
FIGS. 4 and 5 illustrate exemplary systems in accordance with various examples of the present technology.

In a network switch system, a lookup database can be maintained to keep track of routes between a number of end points attached to the switch system. However, end points can have various configurations and are associated with numerous tenants. These end-points can have various types of identifiers, e.g., IPv4, IPv6, or Layer-2. The lookup database has to be configured in different modes to handle different types of end-point identifiers. Some capacity of the lookup database is carved out to deal with different address types of incoming packets. Further, the lookup database on the network switch system is typically limited by 1K virtual routing and forwarding (VRFs). Therefore, an improved lookup algorithm is desired to handle various types of end-point identifiers. The disclosed technology addresses the need in the art for address lookups in a telecommunications network. Disclosed are systems, methods, and computer-readable storage media for unifying various types of end-point identifiers by mapping end-point identifiers to a uniform space and allowing different forms of lookups to be uniformly handled. A brief introductory description of example systems and networks, as illustrated in FIGS. 3 and 4, is disclosed herein. These variations shall be described herein as the various examples are set forth. The technology now turns to FIG. 3.

FIG. 3 illustrates an example computing device 300 suitable for implementing the present technology. Computing device 300 includes a master central processing unit (CPU) 362, interfaces 368, and a bus 315 (e.g., a PCI bus). When acting under the control of appropriate software or firmware, the CPU 362 is responsible for executing packet management, error detection, and/or routing functions, such as miscabling detection functions, for example. The CPU 362 preferably accomplishes all these functions under the control of software including an operating system and any appropriate applications software. CPU 362 can include one or more processors 363 such as a processor from the Motorola family of microprocessors or the MIPS family of microprocessors. In an alternative example, processor 363 is specially designed hardware for controlling the operations of the computing device 300. In a specific example, a memory 361 (such as non-volatile RAM and/or ROM) also forms part of CPU 362. However, there are many different ways in which memory could be coupled to the system.

The interfaces 368 are typically provided as interface cards (sometimes referred to as "line cards"). Generally, they control the sending and receiving of data packets over the network and sometimes support other peripherals used with the computing device 300. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces can include ports appropriate for communication with the appropriate media. In some cases, they can also include an independent processor and, in some instances, volatile RAM. The independent processors can control such communications intensive tasks as packet switching, media control and management. By providing separate processors for the communications intensive tasks, these interfaces allow the master microprocessor 362 to efficiently perform routing computations, network diagnostics, security functions, etc.

Although the system shown in FIG. 3 is one specific computing device of the present technology, it is by no means the only network device architecture on which the present patent application can be implemented. For example, an architecture having a single processor that handles communications as well as routing computations, etc. is often used. Further, other types of interfaces and media could also be used with the router.

Regardless of the network device's configuration, it can employ one or more memories or memory modules (including memory 361) configured to store program instructions for the general-purpose network operations and mechanisms for roaming, route optimization and routing functions described herein. The program instructions can control the operation of an operating system and/or one or more applications, for example. The memory or memories can also be configured to store tables such as mobility binding, registration, and association tables, etc.

Figure 5:
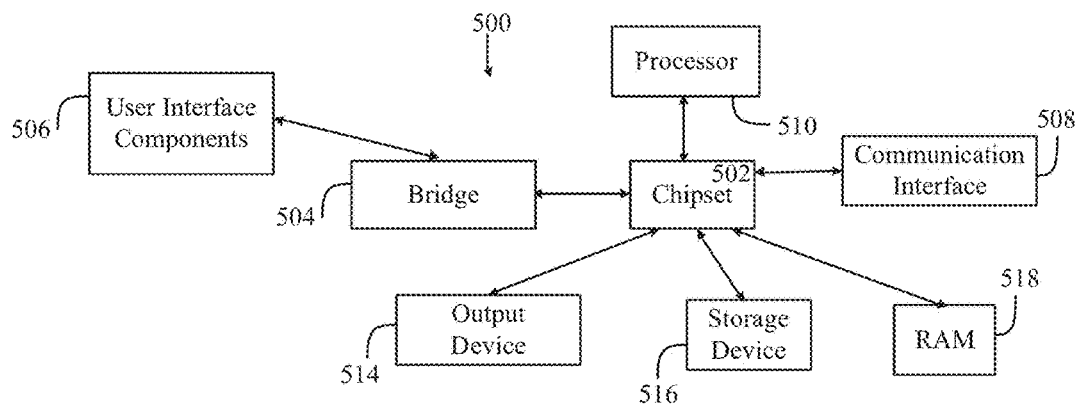

FIGS. 4 and 5 illustrate example system embodiments. The more appropriate embodiment will be apparent to those of ordinary skill in the art when practicing the present technology. Persons of ordinary skill in the art will also readily appreciate that other system embodiments are possible.

FIG. 4 illustrates a system bus computing system architecture 400 wherein the components of the system are in electrical communication with each other using a bus 402. Example system 400 includes a processing unit (CPU or processor) 430 and a system bus 402 that couples various system components including the system memory 404, such as read only memory (ROM) 406 and random access memory (RAM) 408, to the processor 430. The system 400 can include a cache of high-speed memory connected directly with, in close proximity to, or integrated as part of the processor 430. The system 400 can copy data from the memory 404 and/or the storage device 412 to the cache 428 for quick access by the processor 430. In this way, the cache can provide a performance boost that avoids processor 430 delays while waiting for data. These and other modules can control or be configured to control the processor 430 to perform various actions. Other system memory 404 may be available for use as well. The memory 404 can include multiple different types of memory with different performance characteristics. The processor 430 can include any general purpose processor and a hardware module or software module, such as module 1 414, module 2 416, and module 3 418 stored in storage device 412, configured to control the processor 430 as well as a special-purpose processor where software instructions are incorporated into the actual processor design. The processor 430 may essentially be a completely self-contained computing system, containing multiple cores or processors, a bus, memory controller, cache, etc. A multi-core processor may be symmetric or asymmetric.

To enable user interaction with the computing device 400, an input device 420 can represent any number of input mechanisms, such as a microphone for speech, a touch-sensitive screen for gesture or graphical input, keyboard, mouse, motion input, speech and so forth. An output device 422 can also be one or more of a number of output mechanisms known to those of skill in the art. In some instances, multimodal systems can enable a user to provide multiple types of input to communicate with the system 400. The communications interface 424 can generally govern and manage the user input and system output. There is no restriction on operating on any particular hardware arrangement and therefore the basic features here may easily be substituted for improved hardware or firmware arrangements as they are developed.

Storage device 412 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 408, read only memory (ROM) 406, and hybrids thereof.

The storage device 412 can include software modules 414, 416, 418 for controlling the processor 430. Other hardware or software modules are contemplated. The storage device 412 can be connected to the system bus 402. In one aspect, a hardware module that performs a particular function can include the software component stored in a computer-readable medium in connection with the necessary hardware components, such as the processor 430, bus 402, display 436, and so forth, to carry out the function.

The controller 410 can be a specialized microcontroller or processor on the system 400, such as a BMC (baseboard management controller). In some cases, the controller 410 can be part of an Intelligent Platform Management Interface (IPMI). Moreover, in some cases, the controller 410 can be embedded on a motherboard or main circuit board of the system 400. The controller 410 can manage the interface between system management software and platform hardware. The controller 410 can also communicate with various system devices and components (internal and/or external), such as controllers or peripheral components, as further described below.

The controller 410 can generate specific responses to notifications, alerts, and/or events and communicate with remote devices or components (e.g., electronic mail message, network message, etc.), generate an instruction or command for automatic hardware recovery procedures, etc. An administrator can also remotely communicate with the controller 410 to initiate or conduct specific hardware recovery procedures or operations, as further described below.

Different types of sensors (e.g., sensors 426) on the system 400 can report to the controller 410 on parameters such as cooling fan speeds, power status, operating system (OS) status, hardware status, and so forth. The controller 410 can also include a system event log controller and/or storage for managing and maintaining events, alerts, and notifications received by the controller 410. For example, the controller 410 or a system event log controller can receive alerts or notifications from one or more devices and components and maintain the alerts or notifications in a system even log storage component.

Flash memory 432 can be an electronic non-volatile computer storage medium or chip which can be used by the system 400 for storage and/or data transfer. The flash memory 432 can be electrically erased and/or reprogrammed. Flash memory 432 can include erasable programmable read-only memory (EPROM), electrically erasable programmable read-only memory (EEPROM), ROM, NVRAM, or complementary metal-oxide semiconductor (CMOS), for example. The flash memory 432 can store the firmware 434 executed by the system 400 when the system 400 is first powered on, along with a set of configurations specified for the firmware 434. The flash memory 432 can also store configurations used by the firmware 434.

The firmware 434 can include a Basic Input/Output System or its successors or equivalents, such as an Extensible Firmware Interface (EFI) or Unified Extensible Firmware Interface (UEFI). The firmware 434 can be loaded and executed as a sequence program each time the system 400 is started. The firmware 434 can recognize, initialize, and test hardware present in the system 400 based on the set of configurations. The firmware 434 can perform a self-test, such as a Power-on-Self-Test (POST), on the system 400. This self-test can test functionality of various hardware components such as hard disk drives, optical reading devices, cooling devices, memory modules, expansion cards and the like. The firmware 434 can address and allocate an area in the memory 404, ROM 406, RAM 408, and/or storage device 412, to store an operating system (OS). The firmware 434 can load a boot loader and/or OS, and give control of the system 400 to the OS.

The firmware 434 of the system 400 can include a firmware configuration that defines how the firmware 434 controls various hardware components in the system 400. The firmware configuration can determine the order in which the various hardware components in the system 400 are started. The firmware 434 can provide an interface, such as an UEFI, that allows a variety of different parameters to be set, which can be different from parameters in a firmware default configuration. For example, a user (e.g., an administrator) can use the firmware 434 to specify clock and bus speeds, define what peripherals are attached to the system 400, set monitoring of health (e.g., fan speeds and CPU temperature limits), and/or provide a variety of other parameters that affect overall performance and power usage of the system 400.

While firmware 434 is illustrated as being stored in the flash memory 432, one of ordinary skill in the art will readily recognize that the firmware 434 can be stored in other memory components, such as memory 404 or ROM 406, for example. However, firmware 434 is illustrated as being stored in the flash memory 432 as a non-limiting example for explanation purposes.

System 400 can include one or more sensors 426. The one or more sensors 426 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 426 can communicate with the processor, cache 428, flash memory 432, communications interface 424, memory 404, ROM 406, RAM 408, controller 410, and storage device 412, via the bus 402, for example. The one or more sensors 426 can also communicate with other components in the system via one or more different means, such as inter-integrated circuit (I2C), general purpose output (GPO), and the like.

FIG. 5 illustrates an example computer system 500 having a chipset architecture that can be used in executing the described method(s) or operations, and generating and displaying a graphical user interface (GUI). Computer system 500 can include computer hardware, software, and flirmware that can be used to implement the disclosed technology. System 500 can include a processor 510, representative of any number of physically and/or logically distinct resources capable of executing software, firmware, and hardware configured to perform identified computations. Processor 510 can communicate with a chipset 502 that can control input to and output from processor 510. In this example, chipset 502 outputs information to output device 514, such as a display, and can read and write information to storage device 516, which can include magnetic media, and solid state media, for example. Chipset 502 can also read data from and write data to RAM 518. A bridge 504 for interfacing with a variety of user interface components 506 can be provided for interfacing with chipset 502. Such user interface components 506 can include a keyboard, a microphone, touch detection and processing circuitry, a pointing device, such as a mouse, and so on. In general, inputs to system 500 can come from any of a variety of sources, machine generated and/or human generated.

Chipset 502 can also interface with one or more communication interfaces 508 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 510 analyzing data stored in storage 516 or 518. Further, the machine can receive inputs from a user via user interface components 506 and execute appropriate functions, such as browsing functions by interpreting these inputs using processor 510.

Moreover, chipset 502 can also communicate with firmware 512, which can be executed by the computer system 500 when powering on. The firmware 502 can recognize, initialize, and test hardware present in the computer system 500 based on a set of firmware configurations. The firmware 512 can perform a self-test, such as a POST, on the system 500. The self-test can test functionality of the various hardware components 502-518. The firmware 512 can address and allocate an area in the memory 518 to store an OS. The firmware 512 can load a boot loader and/or OS, and give control of the system 500 to the OS. In some cases, the firmware 512 can communicate with the hardware components 502-510 and 514-518. Here, the firmware 512 can communicate with the hardware components 502-510 and 514-518 through the chipset 502 and/or through one or more other components. In some cases, the firmware 512 can communicate directly with the hardware components 502-510 and 514-518.

It can be appreciated that example systems 300, 400 and 500 can have more than one processor (e.g., 363, 430, 510) or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described herein.

Various aspects of the present technology provide systems and methods for smartly resetting a hang device of a server system based upon a WoL message and status of the hang device. While specific examples have been cited above showing how the optional operation can be employed in different instructions, other examples can incorporate the optional operation into different instructions. For clarity of explanation, in some instances the present technology can be presented as including individual functional blocks including functional blocks comprising devices, device components, steps or routines in a method embodied in software, or combinations of hardware and software.

The various examples can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

To the extent examples, or portions thereof, are implemented in hardware, the present patent application can be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Most examples utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network and any combination thereof.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these technologies can comprise hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

In examples utilizing a Web server, the Web server can run any of a variety of server or mid-tier applications, including HTTP servers, FTP servers, CGI servers, data servers, Java servers and business application servers. The server(s) can also be capable of executing programs or scripts in response requests from user devices, such as by executing one or more Web applications that can be implemented as one or more scripts or programs written in any programming language, such as Java®, C, C# or C++ or any scripting language, such as Perl, Python or TCL, as well as combinations thereof. The server(s) can also include database servers, including without limitation those commercially available from open market.

The server system can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system can also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate examples can have numerous variations from that described above. For example, customized hardware might also be used and/or particular elements might be implemented in hardware, software (including portable software, such as applets) or both. Further, connection to other computing devices such as network input/output devices can be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EPROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the technology and teachings provided herein, a person of ordinary skill in the art will appreciate other ways and/or methods to implement the various aspects of the present technology.

The specification and drawings are, accordingly, to be regarded in an illustrative rather than a restrictive sense. It will, however, be evident that various modifications and changes can be made thereunto without departing from the broader spirit and scope of the patent application as set forth in the claims.

What is claimed is:

1. A computer-implemented method for resetting a management device of a system, comprising:
   receiving, at a network interface (NIC) of the system, a wake-on-lan (WoL) message via a switch of the system;
   receiving, at a monitoring device of the system, status information of a management device of the system;
   in an event that the management device is frozen according to the status information, causing the management device to be reset through the monitoring device; and
   in an event that the management device is not frozen according to the status information, shielding the management device from the WoL message to prevent the management device from being reset.

2. The computer-implemented method of claim 1, further comprising:
   determining that the management device is not frozen based upon the status information; and
   shielding the management device from the WoL message to prevent the management device from being reset.

3. The computer-implemented method of claim 1, wherein receiving, at the NIC of the system, the WoL message comprises:
   receiving, at a physical layer hardware (PHY) of the system, the WoL message over a network; and
   receiving, at the switch, the WoL message from the PHY.

4. The computer-implemented method of claim 3, further comprising:
   receiving, at the switch, a network packet via the PHY;
   determining that the management device recovers from being frozen; and
   causing the network packet to be forwarded directly from the switch to the management device.

5. The computer-implemented method of claim 3, wherein the switch communicates with the PHY via a first serial gigabit media independent interface (SGMII) and communicates with the NIC via a second SGMII.

6. The computer-implemented method of claim 3, wherein the switch communicates with the management device via a reduced gigabit media independent interface (RGMII).

7. The computer-implemented method of claim 1, further comprising:
   receiving, at a delay circuit, the WoL message from the NIC; and
   causing the NIC to be reset by the delay circuit.

8. The computer-implemented method of claim 7, wherein causing the NIC to be reset by the delay circuit comprises:
   withholding the WoL message at the delay circuit for a threshold time period; and
   causing the WoL message to be passed on to the NIC at the end of the threshold time period.

9. The computer-implemented method of claim 7, wherein the delay circuit is a LC circuit or an RC circuit.

10. The computer-implemented method of claim 1, wherein the monitoring device comprises a single-stage watchdog circuit or a multistage watchdog circuit.

11. The computer-implemented method of claim 1, wherein the monitoring device comprises a first input pin to receive the status information of the management device and a second input pin to receive the WoL message.

12. The computer-implemented method of claim 11, wherein the status information is received directly from the management device or from a separate device monitoring status of the management device.

13. The computer-implemented method of claim 11, wherein the monitoring device is connected to the management device via an output pin of the monitoring device and a power-on reset pin of the management device.

14. A system, comprising:
   a processor; and
   a computer-readable medium storing instructions that, when executed by the processor, cause the system to perform operations comprising:
      receiving, at a network interface (NIC) of the system, a wake-on-lan (WoL) message via a switch of the system;
      receiving, at a monitoring device of the system, status information of a management device of the system;
      in an event that the management device is frozen according to the status information, causing the management device to be reset through the monitoring device; and
      in an event that the management device is not frozen according to the status information, shielding the management device from the WoL message to prevent the management device from being reset.

15. The system of claim 14, wherein the instructions, when executed by the processor, cause the system to perform operations comprising: determining that the management device is not frozen based upon the status information; and shielding the management device from the WoL message to prevent the management device from being reset.

16. The system of claim 14, wherein receiving, at the NIC of the system, the WoL message comprises: receiving, at a physical layer hardware (PHY) of the system, the WoL message over a network; and receiving, at the switch, the WoL message from the PHY.

17. The system of claim 16, wherein the instructions, when executed by the processor, cause the system to perform operations comprising: receiving, at the switch, a network packet via the PHY; determining that the management device recovers from being frozen; and causing the network packet to be forwarded directly from the switch to the management device.

18. The system of claim 14, wherein the instructions, when executed by the processor, cause the system to perform operations comprising: receiving, at a delay circuit, the WoL message from the NIC; and causing the NIC to be reset by the delay circuit.

19. The system of claim 18, wherein causing the NIC to be reset by the delay circuit comprises: withholding the WoL message at the delay circuit for a threshold time period; and causing the WoL message to be passed on to the NIC at the end of the threshold time period.

20. The system of claim 14, wherein the monitoring device comprises a first input pin to receive the status information of the management device and a second input pin to receive the WoL message, and wherein the monitoring device is connected to the management device via an output pin of the monitoring device and a power-on reset pin of the management device.

* * * * *